Sept. 19, 1944.   J. V. DYRR   2,358,496
RELEASE MEANS
Filed Oct. 30, 1942   2 Sheets-Sheet 1

Inventor
Jacob V. Dyrr,
By
Attorney

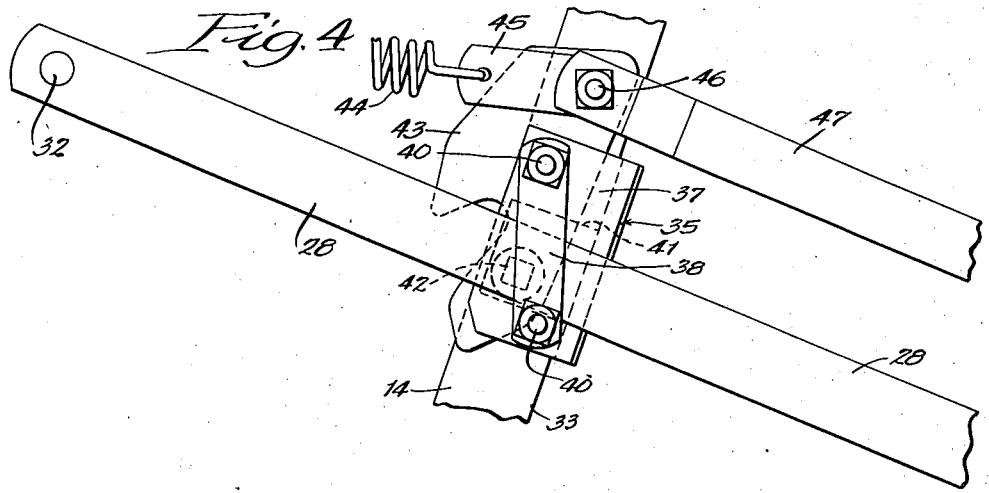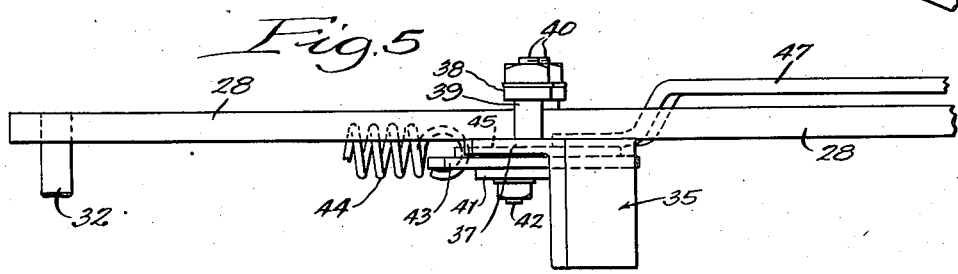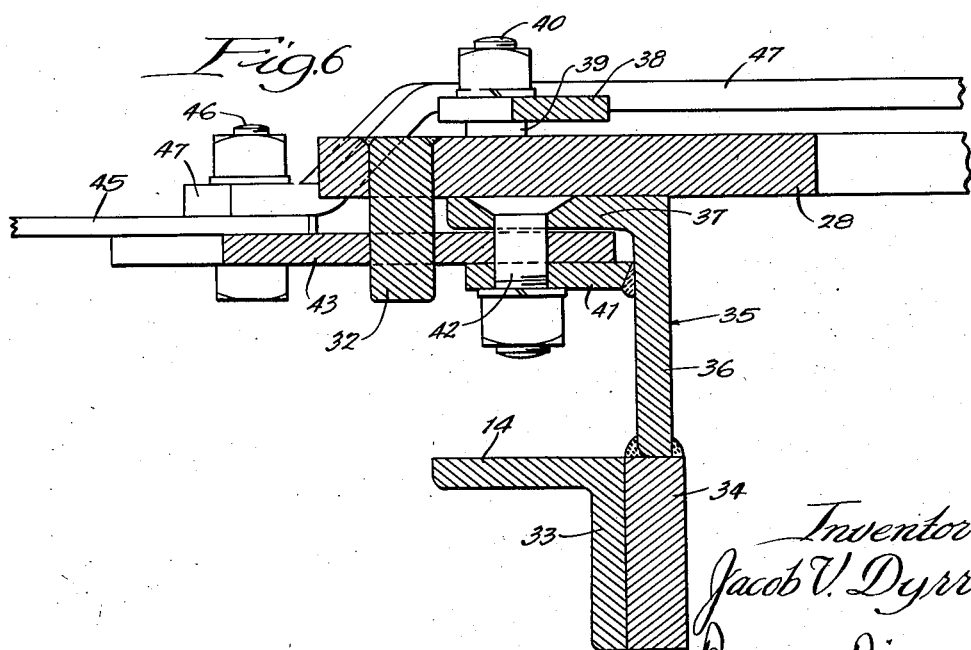

Patented Sept. 19, 1944

2,358,496

UNITED STATES PATENT OFFICE 2,358,496

RELEASE MEANS

Jacob V. Dyrr, Bell, Calif., assignor to International Harvester Company, a corporation of New Jersey Application October 30, 1942, Serial No. 463,945

3 Claims. (Cl. 55—83)

This invention relates to a holding means. More specifically it relates to a lock for an offset harrow.

It is known to provide an offset harrow with a control bar fixing the gangs against relative movement and a releasable means connecting the control bar and the rear gang, which is released for releasing the gangs from one another for a turn of the harrow. This invention has to do with a new and improved form of releasable lock employed in the position described above.

An object of the present invention is to provide an improved holding means.

A further object is the provision of an improvement in an offset harrow.

Another object is to provide an improved holding means for a harrow.

Still another object is the provision of an improved lock construction for an offset harrow.

Other objects will appear from the disclosure.

According to one embodiment of the invention, a control bar, extending between the gangs of an offset harrow, is releasably fixed to the rear gang by means of a pivotally mounted hook on the rear gang which engages a projection on the control bar. A spring maintains the hook in engagement with the projection and when the harrow is to be turned, the necessary pull by the draft means upon turning causes the hook to be pivoted so as to release the projection on the control bar.

In the drawings:

Figure 4 is an enlarged plan view of the holding means occupying the position when the harrow is being turned to the right as shown in Figure 2;

Figure 5 is a side view of the holding means in the position of Figure 4; and

Figure 6 is a sectional view taken on the line 6—6 of Figure 3.

Figure 1:
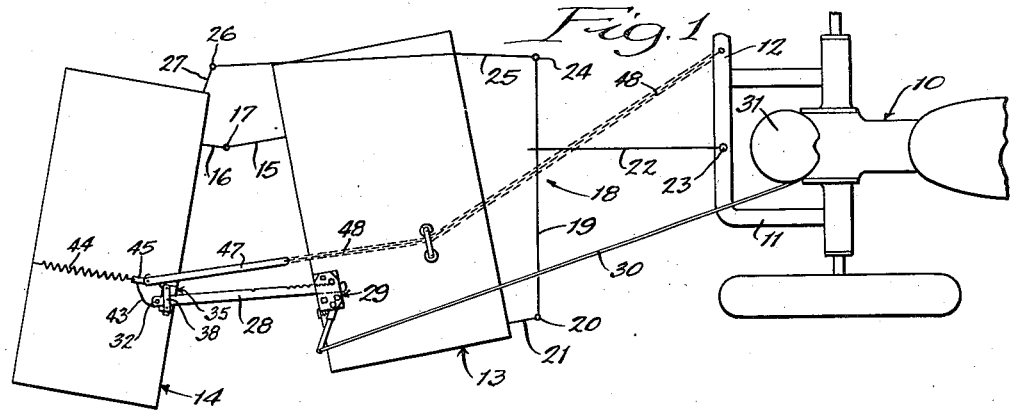
Figure 1 is a plan view of a tractor and a harrow connected thereto in working position and employing the novel holding means of the present invention.

As seen in Figure 1, a tractor 10 has a U-shaped draw bar 11 secured at the rear thereof provided with an offset extension 12. Positioned at the rear of the tractor 10 is an offset harrow, shown schematically. This harrow comprises a front gang 13 and a rear gang 14, the gangs being pivotally connected by pieces 15 and 16 extending respectively rearwardly and forwardly from the front gang 13 and rear gang 14 and joined in a pivot 17. The harrow is connected to the tractor draw bar 11 by means of a rigid hitch frame 18 composed of a transverse member 19 pivotally connected at 20 to an extension 21 of the front gang 13 and a longitudinal member 22 rigidly connected with the transverse member 19 and pivotally connected at 23 to the tractor draw bar 11. The end of the transverse member 19 opposite the pivot 20 is pivotally connected as at 24 with a pull bar 25 pivotally connected at 26 to a lateral extension 27 of the rear gang 14. Extending between the gangs 13 and 14 is a control bar 28 which is releasably connected with the front gang 13 by means 29 under control of a cord 30 extending to within easy reach of an operator's seat 31 upon the tractor 10. This means is not shown in detail in the present application, since it forms no part of the present invention but is shown more fully and claimed in the applicant's copending application, Serial No. 463,946, filed October 30, 1942. It is sufficient to state that the means 29 will upon a pull upon the cord 30 release the control bar 28 from the front gang 13 for the sake of an adjustment of the working position of the harrow or a shifting from working position to transport position.

Figure 2:
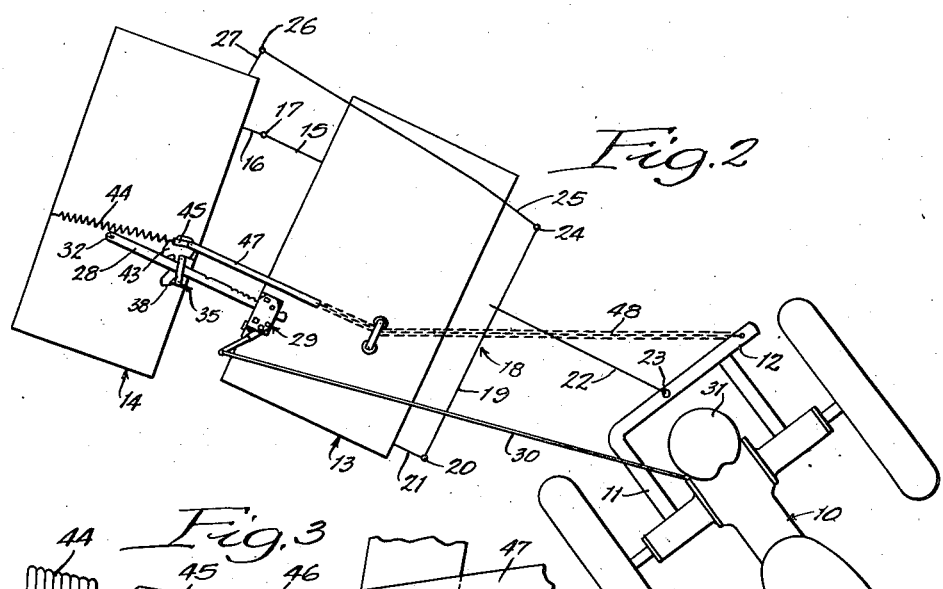
Figure 2 is a plan view of the tractor and harrow of Figure 1 but showing the harrow and tractor in position for a turning to the right.
Figure 3:
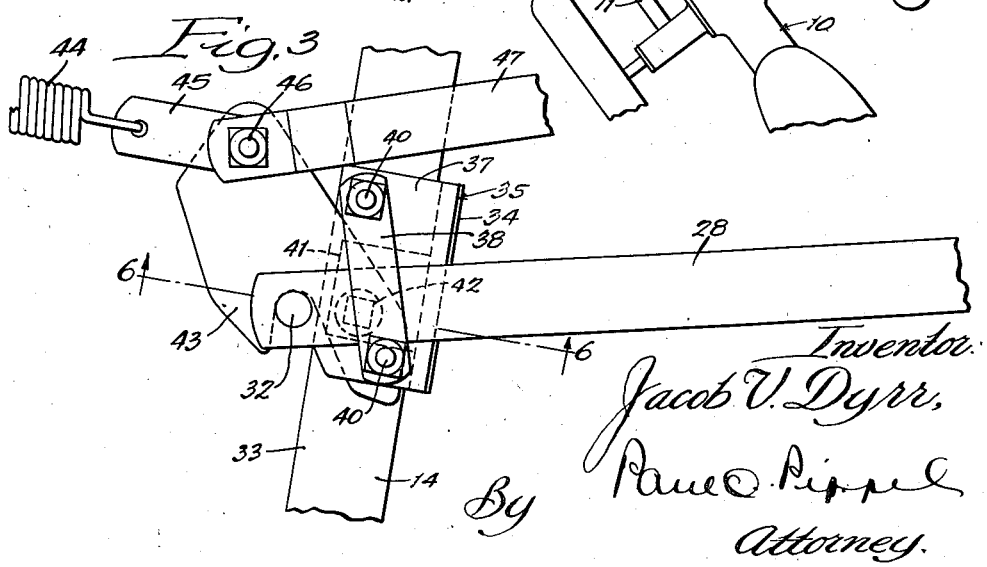
Figure 3 is an enlarged plan view of the holding means of the present invention in the position occupied when the harrow is in the working position of Figure 1.

The rear end of the control bar 28 is connected to the rear gang 14 by the novel means of the present invention shown in some detail in Figures 3 to 6, inclusive. As seen in Figure 6, a member 32 extends through and downwardly from the member 28, being welded thereto so as to form a downwardly extending projection. The rear gang 14 includes an angle member 33 to which is secured a strap 34. An angle member 35 extends upwardly from the strap 34 and is welded thereto. The angle member comprises a vertical leg 36 and a horizontal leg 37, which forms a slidable support for the control member 28. A strap 38 extends across the top of the control bar 28 in spaced relation thereto and serves to retain the control bar 28 upon the horizontal leg 37 of the angle member 35. The strap 38 is held above the control bar 28 by sleeves 39 resting upon the horizontal leg 37. Through the sleeves 39 extend bolts 40 which secure the strap 38 upon the sleeve 39. A part 41 is positioned below the horizontal leg 37 of the member 35 and is welded to the vertical leg 36. A bolt 42 extends through the horizontal leg 37 on the part 41 and with the part 41 forms a pivotal mounting for a hook 43, which engages the pin or projection 32 upon the control bar 28. A spring 44 connected with the hook 43 through a piece 45 resiliently holds the hook 43 in engagement with the projection 32. The spring 44 is attached to the rear side of the rear gang 14 as seen in Figures 1 and 2. A bolt 46 pivotally connects the piece 45 to the hook 43 and also connects a strap 47 to the hook 43. To the strap 47 is connected a chain 48, which is in turn connected to the offset extension 12 of the tractor draw bar 11.

During the normal working position of Figure 1, the gangs 13 and 14 are held against relative movement by the control bar 28, which is connected to the rear gang by virtue of the engagement of the projection 32 with the hook 43. When the tractor 10 and the harrow are to be turned to the right, as shown in Figure 2, the turning of the tractor causes the extension 12 of the draw bar 11 to exert a pull upon the chain 48 and strap 47 which move the hook 43 pivotally about the bolt 42 to the position of Figure 4 in which the projection 32 on the control bar 28 is released. The gangs 13 and 14 of the harrow move to the relative position of Figure 2 in which they are capable of a turn to the right, and the control bar 28 moves rearwardly with respect to the rear gang 14 as shown in Figure 4. When the turn to the right is completed, the extension 12 of the draw bar 11 no longer exerts a pull through the chain 48 and strap 47 upon the hook 43, and so the hook 43 turns to the position of Figure 3. As the gangs 13 and 14 move back to their working position in Figure 1, the control bar 28 moves forwardly with respect to the rear gang 14 and the projection 32 comes into contact with the hook 43 moving it temporarily toward the position of Figure 4 until the projection is reengaged within the hook 43.

It will be apparent from the foregoing description that a new and novel holding means has been provided for use in fixing a control bar to the gang of a harrow. This means comprises a hook which is releasably or resiliently held in engagement with a projection upon the control bar.

The intention is to limit the invention only within the scope of the appended claims.

What is claimed is:

1. In an offset harrow comprising front and rear gangs connected for relative movement and a control bar connected to the front gang and extending between the gangs, the combination therewith of means for releasably connecting the control bar to the rear gang, said means comprising a projection extending downwardly from the control bar, a sliding support for the control bar in spaced relation to and above the rear gang, means cooperating with the sliding support to enclose the control bar thereby to retain the bar upon the sliding support, a piece secured in spaced relation to and below the sliding support, and a hook pivotally mounted between the piece and the sliding support and adapted releasably to engage the projection on the control bar.

2. In an offset harrow comprising front and rear gangs connected for relative movement and a control bar connected to the front gang and extending between the gangs, the combination therewith of means for releasably connecting the control bar to the rear gang, said means comprising a projection extending downwardly from the control bar, an angle member having a vertical leg secured to the rear gang and a horizontal leg positioned above the rear gang and slidably supporting the control bar, a piece secured to the vertical leg of the angle member below the horizontal leg, and a releasable hook pivotally mounted between the piece and the horizontal leg of the angle member and adapted to engage the projection of the control bar.

3. In an offset harrow comprising front and rear gangs connected for relative movement and a horizontally disposed control bar extending between the gangs and releasably and slidably connected with the front gang, the combination therewith of means for releasably and slidably connecting the control bar with the rear gang, said means comprising a single projection only extending in a vertical direction from the control bar at the rear end thereof, a hook mounted for pivotal movement in a horizontal plane upon the said rear gang and spaced from the control bar to be engageable with the projection, and means connected with the hook and operative upon turning of the harrow in one direction to disengage the hook from the projection.

JACOB V. DYRR.